US008979015B2

(12) United States Patent
Gaillard

(10) Patent No.: US 8,979,015 B2
(45) Date of Patent: Mar. 17, 2015

(54) ANTI-TORQUE DEVICE WITH LONGITUDINAL THRUST FOR A ROTORCRAFT

(71) Applicant: Airbus Helicopters, Marignane, Cedex (FR)

(72) Inventor: Christophe Gaillard, La Roque D'Antheron (FR)

(73) Assignee: Airbus Helicopters, Marignane Cedex (FR)

( * ) Notice: Subject to any disclaimer, the term of this patent is extended or adjusted under 35 U.S.C. 154(b) by 304 days.

(21) Appl. No.: 13/678,648

(22) Filed: Nov. 16, 2012

(65) Prior Publication Data
US 2013/0134256 A1    May 30, 2013

(30) Foreign Application Priority Data
Nov. 30, 2011 (FR) ..................................... 11 03643

(51) Int. Cl.
*B64C 27/82* (2006.01)
(52) U.S. Cl.
CPC ......... *B64C 27/82* (2013.01); *B64C 2027/8218* (2013.01); *B64C 2027/8227* (2013.01); *B64C 2027/8236* (2013.01); *B64C 2027/8263* (2013.01)
USPC ..................................... 244/17.19; 244/17.21
(58) Field of Classification Search
USPC ........................................... 244/17.19, 17.21
See application file for complete search history.

(56) References Cited

U.S. PATENT DOCUMENTS

| 2,415,622 | A | * | 2/1947 | Bossi | 244/17.13 |
|---|---|---|---|---|---|
| 2,420,784 | A | * | 5/1947 | Larsen | 244/17.21 |
| 2,698,147 | A | * | 12/1954 | Hovgard | 244/7 R |
| 3,155,341 | A |  | 11/1964 | Girard |  |
| 3,426,982 | A | * | 2/1969 | Markwood | 244/7 C |
| 3,432,119 | A | * | 3/1969 | Miller | 244/6 |
| 3,448,946 | A | * | 6/1969 | Nagatsu | 244/17.19 |
| 3,506,219 | A | * | 4/1970 | Mouille et al. | 244/17.21 |
| 3,540,680 | A | * | 11/1970 | Peterson | 244/17.19 |

(Continued)

FOREIGN PATENT DOCUMENTS

FR    2916418 A1    11/2008
JP    2009051465 A    3/2009

OTHER PUBLICATIONS

Search Report and Written Opinion; Application No. FR 1103643; dated; Jul. 30, 2012.

*Primary Examiner* — Tien Dinh
*Assistant Examiner* — Steven Hawk
(74) *Attorney, Agent, or Firm* — Brooks Kushman P.C.

(57) ABSTRACT

A tail assembly (10) for a rotorcraft (20), the tail assembly (10) comprising a first stabilizer (3) extending transversely on either side of an anteroposterior plane (P1), and a second stabilizer (4, 4") extending in elevation. Two propellers (31, 41) positioned on either side of the anteroposterior plane (P1) provide the rotorcraft (20) with at least part of its yaw control and its propulsion. The axes of the two propellers (31, 41) are situated in a plane substantially parallel to the horizontal plane (P3) and they intersect at a position in the anteroposterior plane (P1) of the rotorcraft (20) that is located between the front end of the rotorcraft (20) and the propellers (31, 41). Using both propellers (31, 41) of the tail assembly (10) simultaneously makes it possible to provide the rotorcraft (20) with longitudinal thrust while conserving its transverse thrust for the anti-torque function, it being possible to control these two thrusts independently.

20 Claims, 4 Drawing Sheets

(56) References Cited

U.S. PATENT DOCUMENTS

| | | | |
|---|---|---|---|
| 3,977,812 A * | 8/1976 | Hudgins | 416/123 |
| 4,347,997 A * | 9/1982 | Byham et al. | 244/17.19 |
| 4,488,851 A * | 12/1984 | Young | 416/33 |
| 4,899,957 A * | 2/1990 | Eickmann | 244/17.11 |
| 5,123,613 A * | 6/1992 | Piasecki | 244/17.19 |
| 5,131,603 A * | 7/1992 | Meyers | 244/17.19 |
| 5,174,523 A * | 12/1992 | Balmford | 244/17.11 |
| 5,269,654 A * | 12/1993 | Chapman | 416/120 |
| 7,823,827 B2 * | 11/2010 | Piasecki et al. | 244/17.19 |
| 8,181,901 B2 * | 5/2012 | Roesch | 244/6 |
| 8,196,855 B2 * | 6/2012 | Balkus, Jr. | 244/17.19 |
| 2009/0014580 A1 * | 1/2009 | Piasecki et al. | 244/17.19 |
| 2009/0159740 A1 * | 6/2009 | Brody et al. | 244/17.21 |
| 2009/0216392 A1 * | 8/2009 | Piasecki et al. | 701/3 |
| 2010/0019079 A1 * | 1/2010 | Evulet et al. | 244/17.19 |
| 2012/0012693 A1 * | 1/2012 | Thomassey | 244/17.21 |
| 2012/0298792 A1 * | 11/2012 | Cardell et al. | 244/17.21 |

* cited by examiner

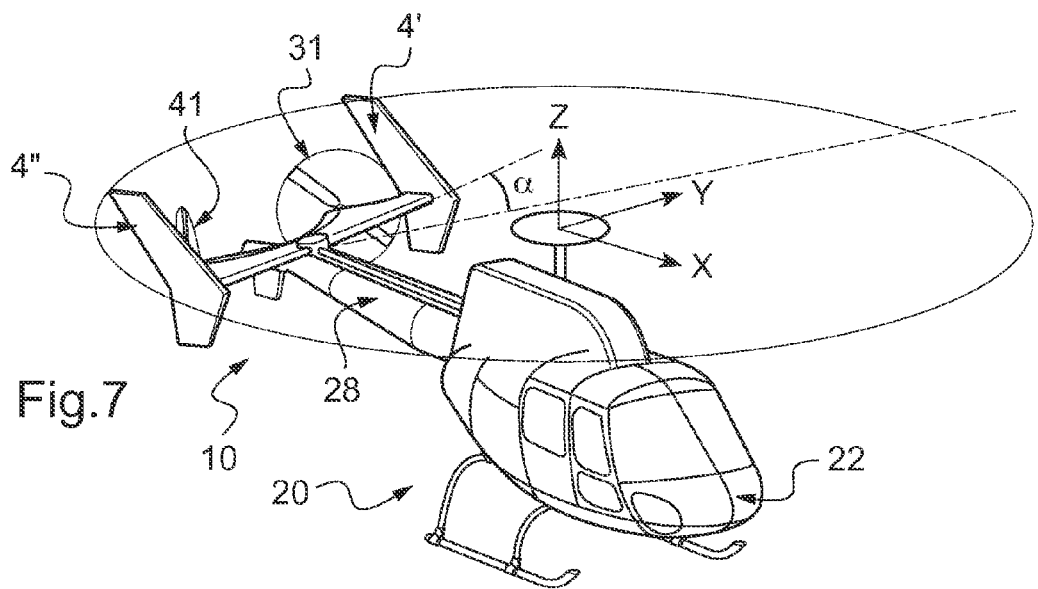
Fig.7
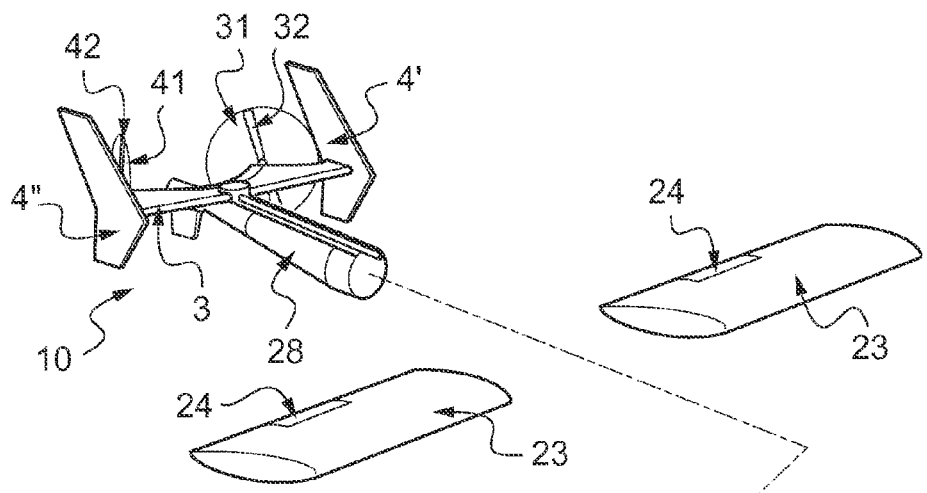
Fig.8
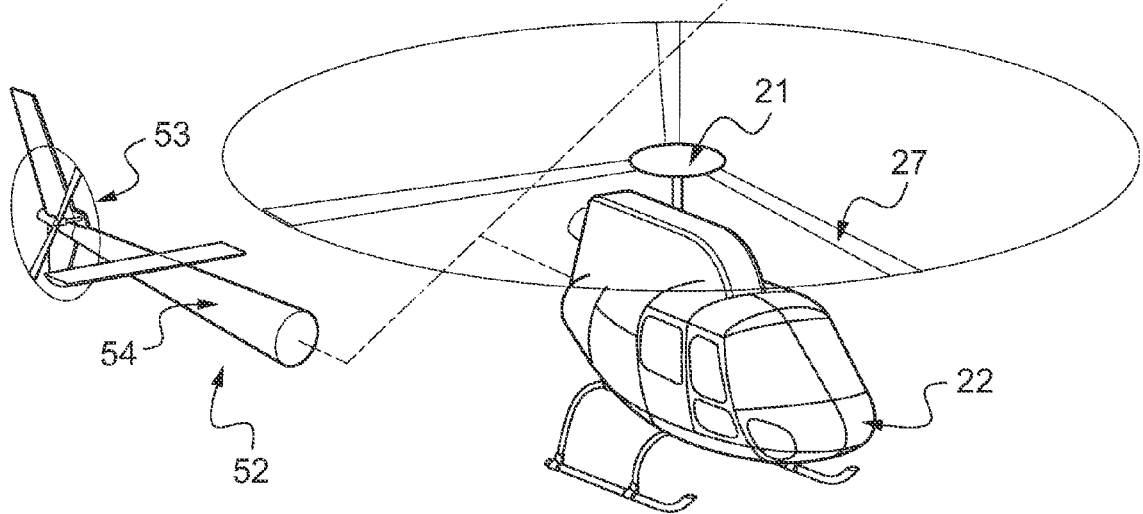

ANTI-TORQUE DEVICE WITH LONGITUDINAL THRUST FOR A ROTORCRAFT

CROSS REFERENCE TO RELATED APPLICATIONS

This application claims priority to French patent application No. FR 11 03643 filed on Nov. 30, 2011, the disclosure of which is incorporated in its entirety by reference herein.

BACKGROUND OF THE INVENTION (1) Field of the Invention

The present invention relates to the field of rotorcraft tail rotors. The present invention relates to an anti-torque device with longitudinal thrust for a rotorcraft. The invention also provides a rotorcraft fitted with such a device. Furthermore, the device is also usable on a drone, i.e. an aircraft not having a human pilot on board. This type of aircraft, generally of size that is small compared with traditional helicopters, is for use in missions of surveillance, information, or combat type.

More particularly, the invention relates to a helicopter having a long range and a high forward speed in cruising flight.

(2) Description of Related Art

A helicopter generally has a single main rotor with a plurality of blades driven mechanically by at least one turbine engine, e.g. the main rotor providing the aircraft with both lift and with propulsion.

A helicopter is traditionally provided with a secondary rotor positioned at the rear end of the aircraft, the secondary rotor providing an anti-torque function in order to compensate for the yaw torque that is created by the rotation of the main rotor, the secondary rotor exerting an opposing transverse thrust. Consequently, such a secondary rotor is referred to as a "tail" rotor or an "anti-torque" rotor by the person skilled in the art. The term tail rotor is used below for convenience.

Furthermore, the tail rotor has a propeller with a plurality of blades, it being possible to modify the pitch of those blades collectively, i.e. to vary the pitch of all of the blades in identical manner. A pilot can thus control yaw and turning movements of the helicopter by modifying the pitch of the blades in the tail rotor so as to modify the magnitude and the direction of the transverse thrust.

The tail rotor is mounted laterally on one end of the helicopter tail boom, or else on a top end of a vertical fin carried by said tail boom.

When installed on a helicopter, the present invention uses longitudinal thrust, making it possible to obtain long range and high forward speed in cruising flight.

Such helicopters relating to an advanced concept of a vertical take-off and landing (VTOL) aircraft are referred to by the person skilled in the art as "hybrid" helicopters.

From the various studies on hybrid helicopters that have already been performed, such an aircraft may comprise the following main elements:

an airframe;

a lift surface secured to the airframe;

stabilization and maneuvering surfaces, namely: in the pitching direction: a horizontal stabilizer with at least one pitching control surface that is movable relative to its front portion or "horizontal plane"; in the yaw direction, at least one suitable stabilizer;

at least one main rotor with the blades of the main rotor having both collective and cyclic pitch control;

at least one propulsive propeller with the blades of the propeller having collective pitch control; and at least one turbine engine driving the main rotor and the propulsive propeller via a mechanical power transmission.

A first study undertaken by Lockheed® in the context of the Cheyenne® program differs from a conventional helicopter by the presence of two wings of small dimensions in addition to the main rotor and the tail rotor, which wings are for providing lift when flying at high speed, and also a third rotor having three blades that is situated at the end of the tail boom of the aircraft perpendicularly to the conventional tail rotor. The function of the third rotor is to propel the aircraft forwards at high speed.

Subsequently, an experimental Piasecki® SpeedHawk® helicopter has made use of a main rotor having four blades and two short wings on either side of the airframe, the conventional tail rotor being replaced by a ducted tail rotor. The ducted tail rotor performs both the anti-torque function and a longitudinal thrust function by using vectored thrust ducted propeller technology.

A recent study concerning a Sikorsky® X2® aircraft has two main rotors, each with four blades that are superposed above the airframe and that are contrarotating, i.e. they rotate in opposite directions to each other. That technique serves to cancel the turning effect on the airframe generated by a single main rotor and thus makes it possible to eliminate the tail rotor that is conventionally used for opposing yaw torque. However, the aircraft has a third rotor located at the rear end of the airframe perpendicularly to the longitudinal axis of the aircraft in order to add longitudinal thrust.

Because of the presence of a lift portion on either side of the airframe for generating lift in cruising flight, the main rotors can deliver less lift under such conditions, thereby limiting the vibration produced with conventional main rotors. In contrast, the main rotors provide all of the lift of the hybrid helicopter during stages of take-off, landing, and vertical flight.

A recent study undertaken by Eurocopter® presents a different architecture. According to patent FR 2 916 418, the aircraft has a main rotor with five blades and two propellers installed on either side of the airframe of the aircraft on wings of small span. Those two propellers provide the longitudinal thrust needed to enable the helicopter to advance at high speed. In that configuration also, the tail rotor is omitted and the turning effect generated by the main rotor is compensated by the two side propellers, by acting on their respective thrusts.

Once more, the lift from the main rotor can be reduced above a certain longitudinal speed at which the lift portion provides sufficient additional lift, thereby making it possible to limit the amount of vibration generated in comparison with conventional main rotors.

Also known from document JP 2009/051465 is a tail rotor system made up of two ducted propellers located on either side of a vertical stabilizer. The axes of the two propellers form a V-shape in a horizontal plane, with the tip of the V-shape pointing rearwards relative to the aircraft so that the axes of the two propellers splay apart from the tail boom of the helicopter on going towards the front of the aircraft.

The air streams generated by the two propellers act via the vertical stabilizer to oppose the turning effect generated by the main rotor and they also enable the aircraft to be controlled in yaw. Furthermore, those air streams provide longitudinal thrust for propelling cruising flight of the aircraft.

The function of the vertical stabilizer is to stabilize the aircraft by channeling and steering the air streams generated by the propellers, both during hovering flight and during cruising flight. A rudder on the rear portion of the vertical stabilizer serves to accentuate this steering of the streams, e.g. in order to perform yaw maneuvers.

In the same manner, a horizontal stabilizer enables the aircraft to be stabilized and controlled in pitching. The vertical stabilizer between the two rotors also serves to avoid air stream turbulences between propellers by isolating the air streams from each of the propellers.

In contrast, steering the air streams in this way involves a significant loss of aerodynamic efficiency, in particular as a result of friction between the air streams and the stabilizers located behind the propellers.

Document U.S. Pat. No. 3,155,341 describes a convertible helicopter that is capable both of behaving like a helicopter, i.e. that is capable in particular of vertical take-off and landing, and also of behaving like an airplane, in particular during high speed cruising flight. For this purpose, that aircraft has firstly two wings, with horizontal and vertical tail stabilizers like an airplane, and secondly a main rotor with a tail rotor like a helicopter. The tail rotor has the special feature of being capable of being swung as a whole about a vertical axis. It can thus act as a conventional tail rotor in helicopter mode, providing essentially all of the anti-torque function, and it can perform the propulsion function of a propeller in airplane mode by being placed perpendicularly to the longitudinal axis of the aircraft.

Document U.S. Pat. No. 2,698,147 describes a rotary wing aircraft having a main rotor for providing lift and propulsion, and two propellers situated at the rear of the aircraft. A first propeller is positioned perpendicularly to the longitudinal axis of the aircraft and performs the anti-torque function and yaw control of the aircraft, while a second propeller is positioned on the longitudinal axis of the aircraft and provides part of its propulsion.

Document US 2009/0159740 describes a rotary wing aircraft having two main rotors that are coaxial, serving mainly to provide lift, and two ducted propellers situated at the rear of the aircraft to provide it with propulsion and with yaw control. The axes of those two propellers are parallel to the longitudinal axis of the aircraft.

BRIEF SUMMARY OF THE INVENTION

An object of the present invention is thus to propose an alternative solution for providing hybrid helicopters.

According to the invention, a tail assembly of a rotorcraft comprises a tail boom and two propellers providing at least part of the yaw control and the propulsion of the rotorcraft, a first propeller being provided with at least two first blades driven in rotation about a first axis and a second propeller being provided with at least two second blades driven in rotation about a second axis.

Firstly, it is possible in this tail assembly to define three axes defining a rectangular coordinate system: a longitudinal axis extending from the front end of the tail boom towards the rear end; a transverse axis extending from right to left; and an elevation axis extending upwards.

An anteroposterior plane for the tail assembly can then be defined. This plane extends from the front end of the tail boom towards the rear end, and is formed by the above-defined longitudinal axis and elevation axis. In principle this anteroposterior plane is vertical when the rotorcraft on which the tail assembly is installed is standing on the ground.

A second plane, referred to for convenience as the "horizontal plane" is perpendicular to the elevation axis of said tail assembly and contains the center of gravity of said assembly. As a result, this horizontal plane is perpendicular to the above-defined anteroposterior plane and contains the transverse axis and the longitudinal axis.

The first and second propellers of the tail assembly are identical and they are positioned on either side of the anteroposterior plane.

As a result, the first axis of rotation of the first propeller and the second axis of rotation of the second propeller are not parallel and they do not coincide, but rather they present a point of intersection positioned in the anteroposterior plane of the tail assembly, between the front end of the tail boom and the first and second propellers.

The assembly is remarkable in that using the first and second propellers simultaneously makes it possible to provide longitudinal thrust while conserving transverse thrust for the anti-torque function, with it being possible for these two thrusts to be controlled independently.

Since the first and second axes of rotation of the first and second propellers intersect, and since the first and second propellers are positioned on either side of the anteroposterior plane, the axis of each propeller cannot be perpendicular to the longitudinal axis of the tail assembly as for a conventional tail rotor. Each axis is therefore inclined relative to the longitudinal axis of the tail assembly and the intersection of the first and second axes of rotation of the first and second propellers is located in front of said propellers.

Consequently, the air streams generated by each of the propellers diverge, in particular when used for providing longitudinal thrust, i.e. during flights at cruising speed. As a result, these air streams move apart from each other, thereby making it possible to reduce significantly the disturbances that might be created between the first and second propellers.

Furthermore, since the force generated by each propeller is inclined relative to the longitudinal axis of the tail assembly, it can be resolved into a transverse component and into a longitudinal component.

The longitudinal components of the first and second propellers can then be combined to form the longitudinal thrust of the tail assembly, which thrust is added to the propulsion effect of the main rotor of the rotorcraft and enables the rotorcraft to obtain high forward speeds.

In order to obtain maximum longitudinal thrust, the longitudinal component of each propeller must be maximized. For this purpose, the plane of the propeller axes as constituted by the first and second axes of rotation of the first and second propellers then needs to contain or be parallel to the longitudinal axis of the tail assembly, with the respective longitudinal components of the first and second propellers both being directed in the same direction.

Similarly, in order to maximize transverse thrust, the transverse component of each propeller must be maximized. For this purpose, the plane of the propeller axes must then contain or be parallel to the transverse axis of the tail assembly, with the respective transverse components of the first and second propellers being directed in the same direction.

Consequently, in order to define an architecture that makes it possible to obtain maximum transverse thrust and maximum longitudinal thrust, the plane of the propeller axes must contain or be parallel to both the transverse axis and the longitudinal axis of the tail assembly, i.e. said plane must coincide with or be parallel to the horizontal plane of the tail assembly.

In a variant of the invention, the plane of the propeller axes is substantially parallel to the horizontal plane of the tail assembly.

The transverse thrust of the tail assembly, which is a combination of the transverse components of the first and second propellers, also constitutes the anti-torque force that opposes the turning effect of the main rotor of the rotorcraft. Since this force is obtained from two propellers, the dimensions of the blades forming the propellers can be reduced compared with a conventional tail rotor, while still being capable of achieving an equivalent anti-torque force. In addition, since the anti-torque force from the assembly is equivalent to that from a traditional tail rotor, the lever arm of the anti-torque force, which lever arm corresponds to the distance between the center of gravity of the rotorcraft and the propellers of the tail assembly, then remains unchanged compared with that of a traditional rotorcraft.

In general, the magnitude of the thrust from a propeller can be modified by acting on the pitch of the blades of said propeller.

Thus, by modifying the respective blade pitches of each of the propellers in different ways, it is possible to vary their respective thrust. As a result, the direction of the resultant of the thrust from the first and second propellers can be modified, as can its magnitude.

It is then possible to modify the transverse thrust from the tail assembly of the invention independently of its longitudinal thrust by appropriately modifying the blade pitch of each propeller.

The tail assembly of the invention may also include one or more additional characteristics.

The tail assembly is for use in particular on hybrid helicopters. Helicopters of this type generally have lift surfaces on either side of the airframe that serve to create additional lift in cruising flight, and they also have tail stabilizers.

In an embodiment of the invention, the tail assembly has a first stabilizer extending transversely on either side of the above-defined anteroposterior plane, and in principle substantially horizontally, but possibly presenting angles relative to said anteroposterior plane, and also has a second stabilizer extending in elevation, and in principle vertically.

For simplification purposes, the description below refers to the "transverse" stabilizer and to the stabilizer "in elevation".

It is specified that each stabilizer may comprise one or more airfoils. Each stabilizer may also be symmetrical about the anteroposterior plane or it may be asymmetrical about this plane. For example, the stabilizer in elevation may be constituted by two airfoils located on either side of the anteroposterior plane and arranged at respective outer ends of the transverse stabilizer.

The anti-torque function opposing the turning effect of the main rotor can then be provided in various ways.

At low or zero forward speeds, the anti-torque function is provided solely by the transverse force generated by each propeller of the tail assembly, which forces are added together, the tail assembly providing this transverse thrust only.

At cruising speeds, the shape of the second stabilizer that extends in elevation is designed, under the effect of aerodynamic forces, to create an anti-torque transverse force that is capable of opposing the turning effect of the main rotor of the rotorcraft in full or in part. Under such circumstances, most or all of the thrust generated by the first and second propellers can be used solely for propelling the rotorcraft in order to improve its performance.

Furthermore, when lift surfaces are also present, additional lift is generated, mainly at cruising speed. The lift generated by the main rotor of the rotorcraft can then be reduced, either by modifying the angle of incidence of the blades of the main rotor, or by reducing the speed of rotation of the main rotor. Either way, the turning effect of the main rotor is reduced, and consequently the anti-torque force that needs to be generated by the tail assembly is also reduced. Once more, most or all of the thrust generated by the first and second propellers can be used solely for propelling the rotorcraft.

When flying at moderate forward speeds, i.e. speeds of the same order as the speed of a conventional rotorcraft, the lift generated by the lift surfaces is not sufficient to reduce the lift from the main rotor of the rotorcraft, so the turning effect of the main rotor therefore remains large. Nevertheless, at such speeds, a transverse force can be created by the stabilizer that extends in elevation, with this force then contributing part of the anti-torque function. The additional transverse force needed to oppose the turning effect of the main rotor in full is provided by the first and second propellers of the tail assembly, with their transverse components being combined. Under such circumstances, the tail assembly can provide some longitudinal thrust for contributing to propulsion of the rotorcraft.

Consequently, the use of lift surfaces and of stabilizers enables the use of the main rotor of the rotorcraft to be optimized as a function of its forward speed and enables maximum use to be made of the tail assembly for propelling the rotorcraft. This serves to optimize the performance of the rotorcraft in terms of speed and range.

Furthermore, in an aspect of the invention, the second stabilizer in elevation does not have any moving parts. Yaw maneuvers and turns are controlled by acting on the transverse thrust from the tail assembly and on the direction in which the lift acts from the main rotor of the rotorcraft, with the contribution of the stabilizer to the transverse force being restricted to the anti-torque function and associated solely with the longitudinal speed of the rotorcraft. Manufacture of this stabilizer without moving parts thus remains simple.

In contrast, the transverse first stabilizer may include moving parts or be movable as a whole in order to modify the lift of said stabilizer. This modification of lift is needed essentially for maneuvering the rotorcraft in cruising flight.

The first and second stabilizers are positioned ahead of the first and second propellers, i.e. between the front end of the tail assembly and the first and second propellers, with this providing several advantages.

Firstly, the air streams flowing over the first and second stabilizers are disturbed little by the rotation of the first and second propellers. The efficiency of the first and second stabilizers of the tail assembly is optimized by limiting the effects of drag.

Furthermore, with the first and second stabilizers located between the first and second propellers and the front end of the tail assembly, occupants entering or leaving the airframe of the rotorcraft, which airframe is situated in front of the tail assembly, are protected from the first and second propellers of the tail assembly by the first and second stabilizers, which stabilizers thus provide protection. Access to the inside of the rotorcraft is thus made safer with respect with the propulsive propellers.

Finally, in the event of the propellers being impacted in flight by external elements, e.g. a bird, since the first and second propellers are positioned at the rear end of the tail assembly, none of its structural parts, such as a stabilizer, will be damaged by the zone in which the propeller breaks up.

In another embodiment of the invention, the first axis of rotation of the first propeller is at an angle of 90° relative to the second axis of rotation of the second propeller. In addition, the first and second axes of rotation are positioned symmetrically about the anteroposterior plane of the tail assembly. This architecture serves to obtain equilibrium between the longitudinal and transverse thrusts from each of the propellers.

Each axis then forms an angle of 45° with the longitudinal axis of the tail assembly. As a result, the magnitude of the longitudinal thrust generated by each of the propellers is always equal to the magnitude of the transverse thrust from that propeller. The respective thrusts from each of the propellers are then geometrically simple to combine in order to obtain the resultant thrust on the tail assembly.

In particular, when the first propeller delivers thrust directed forwards and the second propeller delivers thrust of the same magnitude directed rearwards, then it is possible to obtain a resultant thrust that is transverse only, i.e. that does not include any longitudinal thrust, e.g. while hovering.

Similarly, when the first and second propellers both deliver thrust of the same magnitude directed rearwards, it is possible to obtain a resultant thrust that is longitudinal only, i.e. without any transverse thrust, e.g. for cruising flight.

However, it is possible to select a different architecture. If forward speed and power are given precedence over the anti-torque function of the tail assembly, then the angle defined between the first and second axes of rotation should be less than 90°.

In contrast, in order to give the anti-torque function precedence over speed, then the angle between the axes of rotation of the two propellers should be greater than 90°.

In another embodiment of the invention, the first and second propellers of the tail assembly are driven in rotation by a common tail power transmission gearbox. Conventionally, the propeller constituting the tail rotor is driven in rotation by at least one main engine (also driving the main rotor of the rotorcraft) via a transmission shaft extending along the tail boom of the rotorcraft and via a tail gearbox. That tail gearbox serves to transmit the rotary motion from the main engine while providing transmission at an angle of about 90° as conventionally exists between the drive shaft and the propeller axis of the tail rotor. In the particular context of hybrid helicopters having two propulsive propellers, it is often not possible to use a single gearbox, since the two propellers are too far apart. It is then necessary to use two gearboxes, thereby presenting several drawbacks, such as increased cost and weight of the rotorcraft and possibly also a loss of efficiency in the mechanical transmission of power.

The architecture of the tail assembly of the invention thus makes it possible to use a single tail gearbox to drive both the first and the second propellers, the propellers being located near to each other on the tail boom. This makes it possible to reduce the costs and the weight of the mechanical power transmission in the tail assembly of the invention.

Furthermore, depending on how the gearbox is built, the first and second propellers may rotate in the same direction or they may rotate in opposite directions, in which case they are said to be contrarotating propellers. Under such circumstances, the respective torques from each of the propellers are in opposition, thereby providing a tail assembly that is balanced.

Finally, using a single tail gearbox guarantees that the first and second propellers are synchronized, and when this is combined with the fact that they are contrarotating, it enables two meshing propellers to be used for providing the tail assembly of the invention. This procures an additional advantage in that the volume of the tail assembly can be reduced when the first and second propellers are both contrarotating and meshing.

In a preferred embodiment of the invention, the tail assembly includes a rocker that acts on the respective blade pitches of each of the propellers. In this preferred embodiment, the first and second axes of rotation of the first and second propellers are positioned symmetrically about the anteroposterior plane of the tail assembly. The rocker, which is associated with the blade pitch of each of the propellers, needs to have at least two degrees of freedom. It thus makes it possible to ensure that the variations of those pitches are at a predetermined ratio and consequently to ensure that the thrusts generated by the first and second propellers are at a pre-determined ratio. Consequently, the shape and the movements of the rocker enable the thrusts of each of the propellers to be combined in predetermined manner and consequently enables the transverse and longitudinal thrusts of the tail assembly to be combined in predetermined manner.

Furthermore, in order to obtain behavior that is identical to that of a conventional tail rotor, the rocker should be defined so that when it is in its neutral position, i.e. when the pilot of the rotorcraft is not actuating any control, the resulting longitudinal thrust from the first and second propellers is zero. The tail assembly then produces a resultant thrust that is transverse only, in opposition to the turning effect of the main rotor of the rotorcraft. For this purpose, a first one of the propellers needs to have its thrust directed forwards and the other or second propeller needs to have its thrust directed rearwards, with the magnitude of the thrust from each of the propellers being identical, and with the propeller that is selected to be the "first" propeller being a function of the direction in which the anti-torque force is to be generated.

This initial position in which the longitudinal thrust from the tail assembly is zero can act as a reference position in order to define the direction in which thrust from each propeller is varied and the direction in which the blade pitch of each propeller is varied. It can thus be defined that an increase in the pitch of the blades of one propeller increases its longitudinal thrust towards the rear of the tail assembly, a reduction of this pitch then lowering this rearward longitudinal thrust possibly to such an extent as to reverse the thrust direction, i.e. so as to obtain forward longitudinal thrust from the tail assembly.

During a first movement of the rocker, the magnitude of the transverse resultant of the thrust from the first and second propellers is modified while the resultant longitudinal thrust is left unchanged. For this purpose, the variations in longitudinal thrust from each of the propellers must cancel. Since the thrust directions from each of the propellers are symmetrical about the anteroposterior plane of the tail assembly, it then suffices for the variations in the magnitudes of these thrusts to be identical, one directed forwards and the other rearwards. Since variation in the magnitude of the thrust from a propeller is proportional to variation in its pitch, it therefore suffices for the pitches of the blades of each of the propellers to vary through opposite values, assuming that the two propellers are identical.

The first movement of the rocker must therefore give rise to simultaneous opposite variations in the blade pitches of the propellers so as to vary the transverse thrust from the tail assembly of the invention while the resultant longitudinal thrust remains constant.

In a second movement of the rocker, the magnitude of the longitudinal resultant of the thrust from the first and second propellers is modified while the resulting transverse thrust remains unchanged. For this purpose, the variations in the transverse thrust from each of the propellers must cancel. In the same manner as above, it can be deduced that it suffices for the variations in the magnitudes of the thrust to be identical, and in the same direction.

The second movement of the rocker must therefore give rise to simultaneous identical variation in the blade pitch of each of the propellers so as to obtain variation in the longitudinal thrust from the tail assembly of the invention, while the resulting transverse thrust remains constant.

The above-described operation should be understood as applying to first and second propellers that are completely identical in an environment that is not disturbed. In practice, the tail assembly is subjected to various aerodynamic disturbances, in particular as a result of the air streams generated by the main rotor, which may then have differing effects on the first and second propellers.

The location of the rocker, its shape, and its movements may be defined so as to compensate for the effects of those aerodynamic disturbances and thus obtain a predetermined ratio between the pitch variations of the first and second propellers. This predetermined ratio may depend in particular on the architecture of the aircraft on which the tail assembly of the invention is installed, and it may also take account of any differences that might exist between the first and second propellers.

Thus, the first movement of the rocker giving rise to simultaneous variations in opposite directions of the blade pitches of each of the propellers with a predetermined ratio makes it possible to obtain variation in the transverse thrust from the tail assembly of the invention while the resulting longitudinal thrust remains constant. Similarly, the second movement of the rocker giving rise to simultaneous variations in the same direction of the blade pitches of each of the propellers at the predetermined ratio then serves to obtain variation in the longitudinal thrust from the tail assembly while the resulting transverse thrust remains constant.

Consequently, the rocker enables the transverse and longitudinal thrusts from the tail assembly to be controlled independently. A rotorcraft fitted with such an assembly can then perform yaw or turning maneuvers without modifying the forward speed of the aircraft or the power delivered for said forward speed while the rocker is performing its first movement. The rocker also makes it possible to increase or reduce the longitudinal thrust and thus the forward speed of the rotorcraft without any impact on the transverse thrust while it is performing its second movement. Naturally, it is possible to perform both movements of the rocker simultaneously, in which case the rotorcraft performs a yaw maneuver while simultaneously modifying its longitudinal thrust.

The invention remains simple to use in spite of the first and second propellers delivering thrust in different directions. Maneuvering a rotorcraft fitted with a tail assembly of the invention remains identical to maneuvering a conventional rotorcraft.

The longitudinal thrust control is an additional control that can be added simply without impacting the conventional flight controls and with no direct effect on the direction of a rotorcraft fitted with a tail assembly of the invention.

In a particular embodiment, the first movement of the rocker is a movement in rotation while the second movement of the rocker is a movement in translation.

The axis for translation movement of the rocker lies in the anteroposterior plane of the tail assembly, i.e. the plane about which the first and second axes of the first and second propellers are arranged symmetrically. The axis of rotation of the rocker also lies in said anteroposterior plane and extends in the elevation direction of the tail assembly.

The first movement of the rocker is a movement in rotation that gives rise to a modification of the blade pitch of each of the propellers so as to obtain solely a variation in the transverse thrust from the tail assembly. The second movement of the rocker is a movement in translation that gives rise to a modification of the blade pitch of each of the propellers so as to obtain solely a variation in the longitudinal thrust from the tail assembly.

In a variant of the invention, the movement in translation of the rocker that varies the longitudinal thrust of the tail assembly may be obtained by means of at least one first electric motor. Since the longitudinal thrust function does not exist on conventional rotorcraft, it is necessary to add an additional control in the cockpit of the rotorcraft. This additional control is simple to install if an electric motor is used, as contrasted with a mechanical control. Furthermore, since electric flight controls are becoming ever more common, it is advantageous for this new function to be electrically controlled.

In another variant of the invention, the rotary movement of the rocker that varies the transverse thrust of the tail assembly may be obtained by means of at least one second electric motor. This transverse thrust function that is used in particular for controlling yaw maneuvers already exists on conventional rotorcraft. The mechanical controls for performing this function on traditional rotorcraft may be adapted for controlling the tail assembly of the invention. However, it is also advantageous to take account of electric flight controls that are becoming more common, which justifies the possibility of using an electric motor.

In another embodiment, the first and second propellers of the tail assembly of the invention are ducted in fairings that serve essentially to protect the environment outside the rotary elements constituting the first and second propellers, and also to protect the propellers from the outside environment.

People moving in the vicinity of the rotorcraft are thus protected from the rotary blades of the first and second propellers of the tail assembly by the fairings. Similarly, each propeller is protected from any external elements that might penetrate into the perimeter of blade rotation and damage the blades.

However, the advantages that are normally to be found with a fairing do not necessarily arise, in particular in terms of aerodynamics, since the propellers of the tail assembly are not parallel to the longitudinal axis.

In another embodiment, the plane of the propeller axes as defined by the first and second axes of the first and second propellers is inclined in order to compensate for the weight of the tail assembly of the invention. In spite of using a common tail gearbox for both propellers, using two propellers nevertheless increases the weight of the tail assembly and thus the weight at the end of the tail boom of the rotorcraft. In order to compensate for the impact of this additional weight, it is possible for the first and second propellers to be directed a little in such a manner that a vertical component of the thrust that results from the first and second propellers counters the weight of the tail assembly.

At least two variants are possible for this compensation of the weight of the tail assembly.

Firstly, the plane of the propeller axes may be inclined about the longitudinal axis of the tail assembly. This variant uses a fraction of the transverse component of the thrust that results from the first and second propellers in order to compensate for the weight of the tail assembly.

In another variant, the plane of the propeller axes is inclined about the transverse axis of the tail assembly. This variant uses a portion of the longitudinal component of the resultant thrust from the first and second propellers to compensate for the weight of the tail assembly.

In addition, at high forward speeds, the horizontally extending first stabilizer can also be designed to generate a lift force for compensating the weight of the tail assembly in full or in part.

The present invention also provides a rotorcraft including the above-described tail assembly.

Firstly, a rotorcraft has three axes that are equivalent and parallel to the axes defined for the tail assembly, i.e. a longitudinal axis extending from the front tip of the airframe to the rear end of the tail boom of said rotorcraft, a transverse axis extending from right to left, and an elevation axis extending upwards.

Similarly, an anteroposterior plane of the rotorcraft can be defined. This plane extends from the front to the rear of the rotorcraft and is formed by its longitudinal axis and its elevation axis as defined above, and it generally coincides with the anteroposterior plane of the tail assembly. A second plane that is referred to for convenience as the "horizontal plane of the rotorcraft" is perpendicular to the elevation axis of the rotorcraft and contains the center of gravity of the rotorcraft. As a result, this plane is parallel to the horizontal plane of the tail assembly and contains the transverse axis of the rotorcraft.

A conventional rotorcraft has at least one main rotor, an airframe, an engine, a rear structure provided with a tail boom, and a tail rotor for providing yaw control of the rotorcraft.

Said rear structure may then be physically replaced by a tail assembly of the invention, in particular because the lever arm relative to the center of gravity of the rotorcraft is identical for the anti-torque force from a conventional tail rotor and for the anti-torque force from a tail assembly of the invention.

In a variant of the invention, a lift surface extending transversely on either side of the airframe and provided with at least two control surfaces may be added to the rotorcraft. This obtains the advantages associated with using a lift surface, in particular in terms of improving the performance of the rotorcraft.

In another embodiment of the invention, a rotorcraft may be defined to be capable of using either a rear structure having a conventional tail rotor, or a tail assembly of the invention.

Under such circumstances, the rear structure and the tail assembly are interchangeable. This transformation is made possible because of the particular features of the invention, including amongst others the lever arm relative to the center of gravity of the aircraft that is identical for the anti-torque force from the rear structure provided with a conventional tail rotor and from the tail assembly of the invention.

In addition, since the flight controls for performing yaw maneuvers are identical for both types of rotorcraft, only the longitudinal thrust control differs and needs to be taken into account when modifying the rotorcraft. This control then operates on the longitudinal thrust when using the tail assembly of the invention and has no effect when using the rear assembly having a traditional tail rotor.

Finally, the possibility of using electric motors for controlling the rocker and consequently for controlling blade pitch variations of the propellers in the tail assembly serves to simplify this transformation by limiting the number of mechanical controls between the airframe and the tail assembly of the rotorcraft. In the particular circumstance of using electric motors for controlling both of the movements of the rocker for controlling the blade pitches of the propellers of the tail assembly, only the connection of the shaft transmitting rotation to the propellers of the tail assembly from the power plant present in the rotorcraft needs to be implemented mechanically. Thereafter, since the other controls are electrical, assembling the tail assembly on the airframe is simplified.

In a variant, the lift surface that extends transversely on either side of the airframe and that is provided with at least two control surfaces may also be added to a rotorcraft fitted with a tail assembly of the invention, thus making it possible to achieve a greater range and a higher forward speed in cruising flight.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIG. 7 shows another embodiment of the invention; and

FIG. 8 is an overall view of a helicopter with an interchangeable system for its tail assembly.

Elements that are present in more than one of the figures are given the same references in each of them.

DETAILED DESCRIPTION OF THE INVENTION

Figure 1:
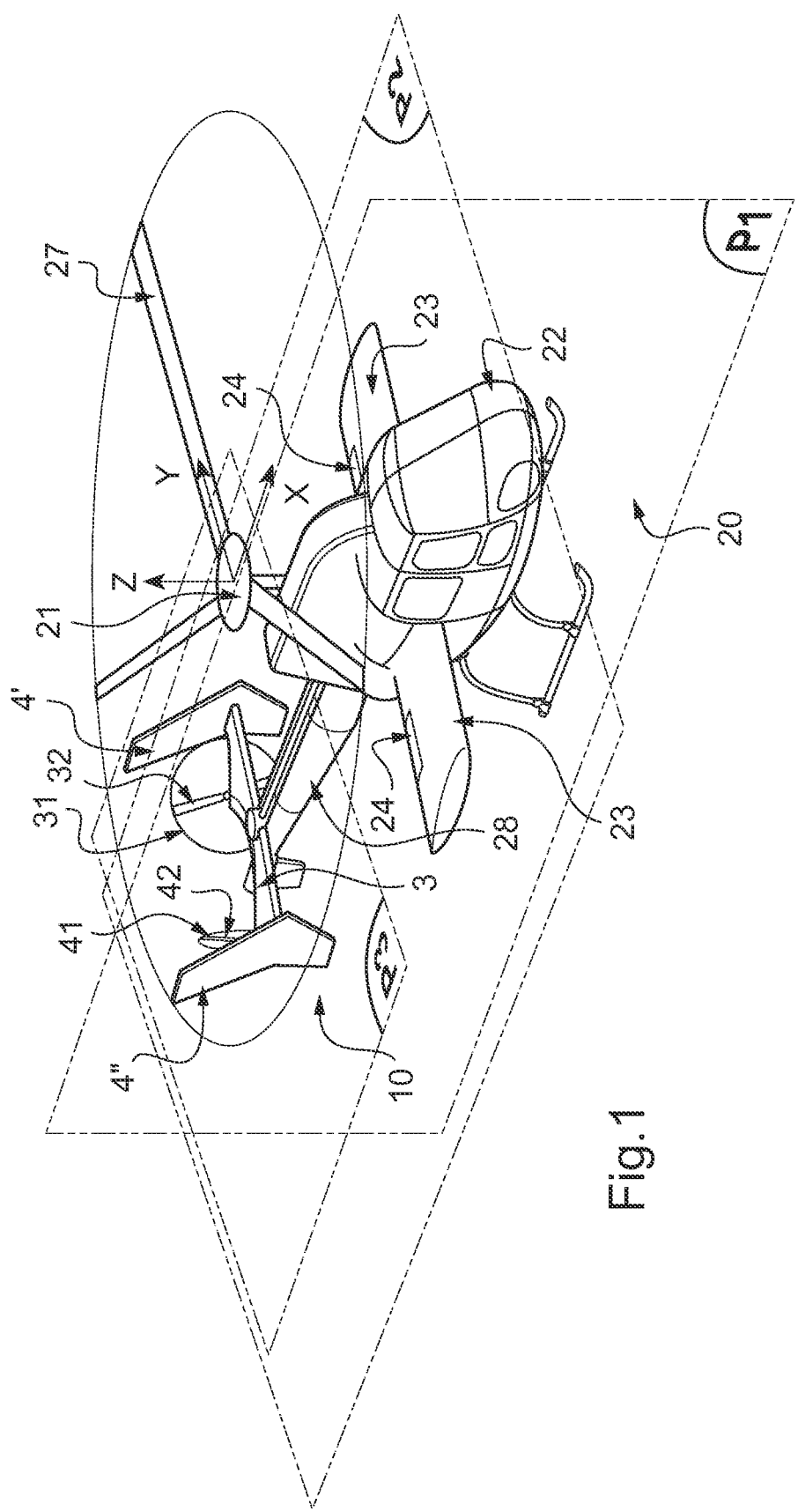
FIG. 1 is an overall view of a helicopter having a tail assembly of the invention.
Figure 2:
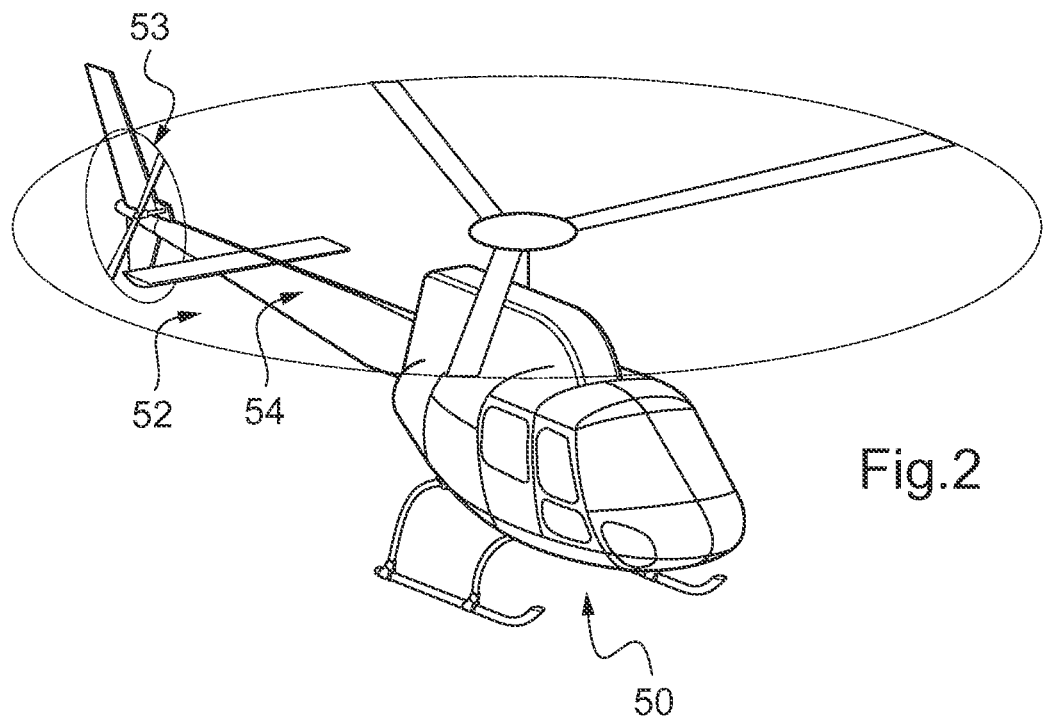
FIG. 2 is an overall view of a helicopter having a conventional tail rotor.
Figure 3:
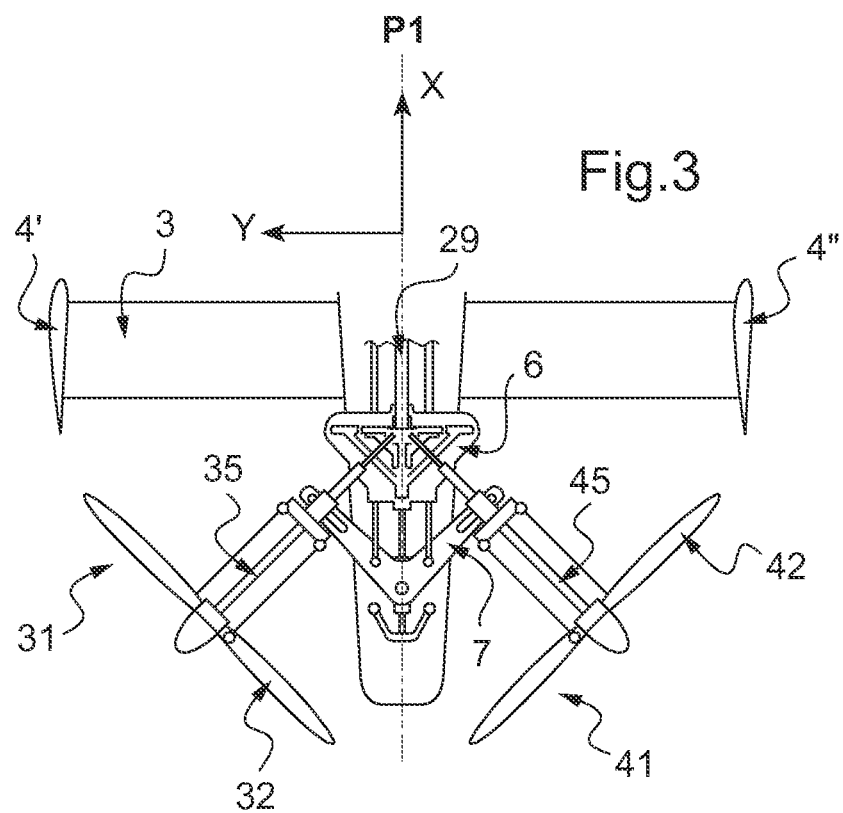
FIGS. 3 to 5 are views of a preferred embodiment of the invention.

Firstly, it should be observed that three directions X, Y, and Z are shown in FIGS. 1, 3, and 7 and they form a rectangular coordinate system.

The first direction X is said to be longitudinal. It extends from front to rear, i.e. from the front tip of the helicopter airframe to the rear end of the tail boom of said helicopter. The term "longitudinal" relates to any direction parallel to the first direction X.

The second direction Y is said to be transverse. It extends from right to left. The term "transverse" relates to any direction parallel to the second direction Y.

Finally, the third direction Z is said to be in elevation. It extends upwards. The term "in elevation" relates to any direction parallel to the third direction Z.

It should also be observed that three particular planes P1, P2, and P3 are shown in FIGS. 1 and 3.

The first plane P1 is an anteroposterior plane of the helicopter 20, extending from the front to the rear of said helicopter 20. It is made up of the directions X and Z (longitudinal and elevation directions). This anteroposterior plane is in principle vertical when the helicopter 20 on which the tail assembly is installed is on the ground.

The second plane P2 is perpendicular to the direction Z (the elevation direction) and contains the center of gravity of the helicopter 20. As a result, this plane P2 is perpendicular to the anteroposterior plane P1 as defined above and it contains the direction Y (the transverse direction). This plane P2 corresponds to the "horizontal plane of the rotorcraft" as referred to above.

The third plane P3, referred to below for convenience as the "horizontal" plane is perpendicular to the direction Z (the elevation direction) and contains the center or gravity of the tail assembly 10. As a result, the plane P3 is parallel to the plane P2.

The plane P1 is the anteroposterior plane both of the helicopter 20 and of the tail assembly 10.

FIG. 1 shows a hybrid helicopter 20 having a tail assembly 10 of the invention. Such a helicopter 20 comprises an airframe 22, a main rotor 21 having a plurality of blades 27, and a lift surface 23 extending transversely on either side of the airframe 22.

The tail assembly 10 has a tail boom 28, a first stabilizer 3 that is substantially horizontal, extending transversely on either side of said anteroposterior plane P1, a second stabilizer made up of two airfoils 4' and 4" that are substantially vertical, extending in elevation on either side of the plane P1, a first propeller 31, and a second propeller 41. The first propeller 31 has at least two first blades 32 and is driven in rotation about a first axis 35, and the second propeller 41 has at least two second blades 42 and is driven in rotation about a second axis 45. The first blade 31 and the second blade 41 are positioned on either side of the anteroposterior plane P1 and they are suitable for providing said helicopter 20 with at least part of its yaw control and its propulsion.

The first and second propellers 31 and 41 are arranged in such a manner that the first and second axes of rotation 35 and 45 lie in a plane substantially parallel to the horizontal plane P3 and intersect at a location in the anteroposterior plane P1 between the front end of the tail boom 28 of the helicopter 20 and the first and second propellers 31 and 41.

The first stabilizer 3 may be movable or may contain one or more control surfaces in order to modify the lift of said stabilizer 3, while the second stabilizer 4' and 4" is stationary.

By using both the first and second propellers 31 and 41 simultaneously, the assembly 10 serves to provide the helicopter 20 with longitudinal thrust while also conserving transverse thrust for the anti-torque function, with it being possible to control these two thrusts independently.

The first axis of rotation 35 and the second axis of rotation 45 need not be perpendicular to the longitudinal direction X as in a conventional tail rotor. The first propeller 31 and the second propeller 41 are positioned on either side of the anteroposterior plane P1, and the first axis of rotation 35 and the second axis of rotation 45 intersect. Each of the axes 35 and 45 is inclined in a plane that is substantially parallel to the horizontal plane P3. As a result, the forces generated by each of the propellers 31 and 41, which forces are parallel to the respective axes 35 and 45, can be resolved into transverse components and longitudinal components.

The anti-torque force of the tail assembly 10 of the invention that opposes the turning effect of the main rotor 21, is thus made up of the combination of the transverse components from the first and second propellers 31 and 41. Furthermore, since the anti-torque force of this assembly is equivalent to that of a conventional helicopter 50, the lever arm between the center of gravity of the helicopter 20 and the first and second propellers 31 and 41 remains unchanged compared with that of a conventional helicopter 50.

The combined longitudinal components from the first and second propellers 31 and 41 constitutes the longitudinal thrust that is added to the propulsion effect from the main rotor 21 of the helicopter 20 and that enables high forward speeds to be obtained.

It can also be seen that the first and second propellers 31 and 41 are positioned behind the first and second stabilizers 3, 4', and 4", i.e. between the first and second stabilizers 3, 4', and 4" and the rear end of the helicopter 20.

This particular architecture serves firstly to protect occupants entering or leaving the helicopter 20 from the first and second propellers 31 and 41 by means of the first and second stabilizers 3, 4', and 4".

In addition, the first and second stabilizers 3, 4', and 4" are disturbed little from an aerodynamic point of view by the rotation of the first and second propellers 31 and 41. The efficiency of the first and second stabilizers 3, 4', and 4" is optimized, in particular by limiting drag effects.

Finally, in the event of the first propeller 31 or the second propeller 41 impacting an external element in flight, the break-up damage zone situated generally at the impacted propeller is located at the rear end of the helicopter 20 and no structural part such as the first stabilizer 3 or the second stabilizer 4' and 4" is damaged.

In FIG. 3, a tail power gearbox 6 serves to drive the first and second propellers 31 and 41 of the tail assembly 10, said tail gearbox 6 being connected to the main engine (not shown) of the helicopter 20 by a transmission shaft 29.

In the particular context of hybrid helicopters using two propulsive propellers, it is sometimes not possible to use only one tail gearbox, since the two propellers are spaced apart too far from each other. It is then necessary to use two tail gearboxes, leading to several drawbacks, such as an increase in the cost and the weight of the helicopter, and possibly also to a decrease in the mechanical efficiency of the transmission line.

Since the first propeller 31 and the second propeller 31 are located close to each other at the end of the tail boom 28 of the helicopter 20, it is possible to use a single gearbox 6 for driving both the first and the second propellers 31 and 41, thereby enabling the cost and the weight of the transmission in such a helicopter 20 to be reduced.

In a variant of the invention, the first propeller 31 and the second propeller 41 are contrarotating and meshing, thereby providing additional advantages. In particular, the respective torques from the propellers 31 and 41 oppose each other so as to provide a balanced tail assembly 10, and it is also possible to reduce the volume of the tail assembly 10, with the use of a single gearbox 6 guaranteeing that the first and second propellers 31 and 41 are synchronized.

Figure 4:
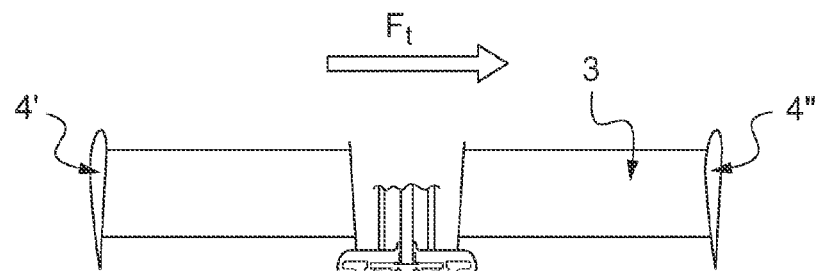
Figure 4:
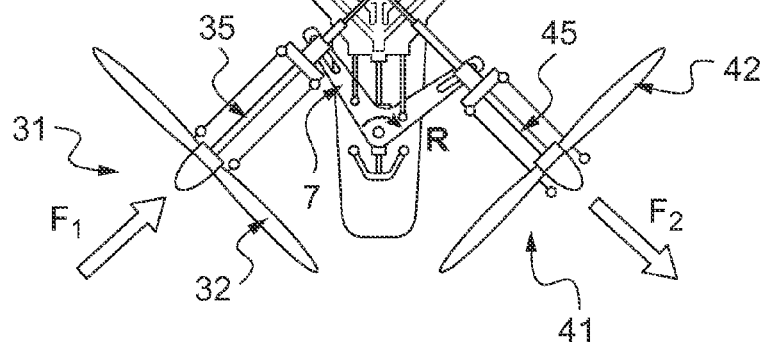
Figure 5:
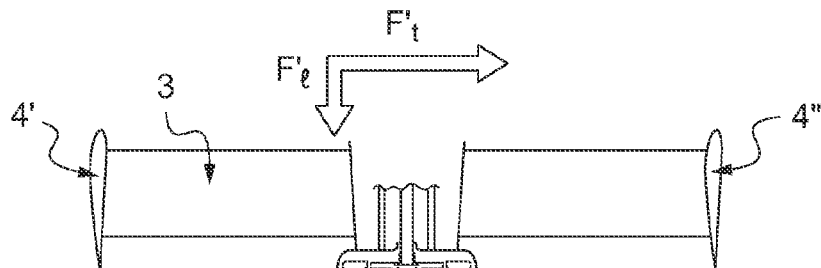
Figure 5:
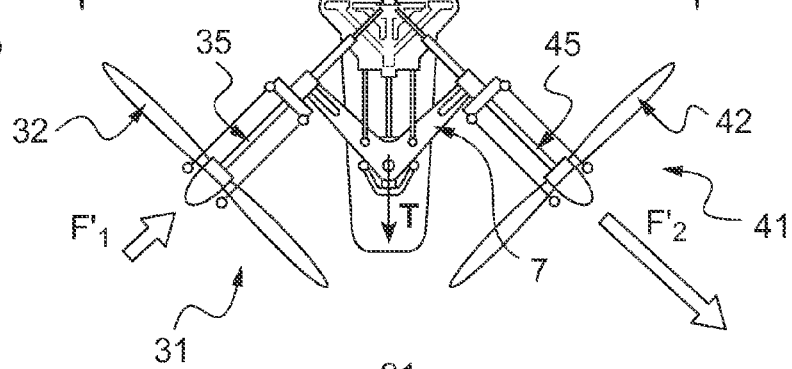

FIGS. 3 to 5 show a preferred embodiment of the assembly 10 in which a rocker 7 that is movable both in translation and in rotation relative to the tail boom 28 of the helicopter 20 is connected to each of the propellers 31 and 41 and acts directly on their respective pitches.

In this embodiment, the first axis 35 of the first propeller 31 and the second axis 45 of the second propeller 41 form an angle of 90° and they are positioned symmetrically about the anteroposterior plane P1. This particular configuration makes it possible to have balance between the longitudinal and transverse thrusts from each of the propellers.

Since the axes 35 and 45 then form respective angles of 45° with the longitudinal axis of the helicopter 20, the longitudinal thrusts generated by each of the propellers 31 and 41 are always equal to the corresponding transverse thrusts from each of the propellers 31 and 41. The thrusts from each of the propellers are then geometrically simple to combine in order to obtain the resultant thrust from the tail assembly 10.

However, it is possible to select a different architecture. If forward speed and power are to be given precedence over the anti-torque function of the tail assembly 10, then it is possible to define an angle of less than 90° between the axes 35 and 45 of the two propellers 31 and 41.

Otherwise, in order to give precedence to the anti-torque function over speed, it is possible to define an angle greater than 90° between the axes 35 and 45 of the two propellers 31 and 41.

In this preferred embodiment, the rocker 7 creates a mechanical link between variations in the pitches of the first blades 32 of the first propeller 31 and of the second blades 42 of the second propeller 41. By virtue of its shape and its movements, the rocker 7 makes it possible to obtain a predetermined ratio between the pitch variations of the first blades 32 and of the second blades 42, and consequently between the thrusts generated by the first propeller 31 and by the second propeller 41. It is then possible to control the transverse and longitudinal thrusts of the tail assembly 10 independently.

In FIG. 4, mere turning of the rocker 7 as shown by arrow R serves to modify simultaneously the pitch of the first blades 32 and the pitch of the second blades 42 in such a manner that the magnitudes of the respective thrusts F1 from the first propeller 31 and F2 from the second propeller 41 are both modified by the same amount, one forwards and the other rearwards. Consequently, the magnitude of the transverse thrust Ft that results from the thrust F1 and F2 of the first and second propellers 31 and 41 is changed, while the magnitude of the resulting longitudinal thrust F1 remains unchanged, and equal to zero in the example of FIG. 4.

In FIG. 5, merely moving the rocker 7 in translation along arrow T serves to modify the pitches of the first blades 32 and of the second blades 42 in such a manner that the longitudinal thrust from each propeller is increased by the same value rearwards, i.e. the thrust F1' from the first propeller which is directed forwards is reduced, while the thrust F2' from the second propeller, which is directed rearwards, is increased by the same amount. Consequently, the longitudinal magnitude F1' resulting from the thrusts F1' and F2' from the first and second propellers 31 and is changed, whereas the magnitude of the resulting transverse thrust Ft' remains unchanged.

Consequently, the helicopter 20 can perform yaw maneuvers or turns without modifying its forward speed or the power delivered for moving forwards. It is also possible to increase or reduce the longitudinal thrust from the tail assembly 10, and thus the forward speed, without having an impact on transverse thrust.

The tail assembly 10 has a stabilizer that extends in elevation, e.g. vertically, and made up of two airfoils 4' and 4". Because of its shape and under the effect of aerodynamic forces that are generated in particular at cruising speeds, this stabilizer 4' and 4" is capable of creating an anti-torque transverse force that is sufficient to oppose the turning effect of the main rotor 21 of the helicopter 20 in full or in part. Under such circumstances, most or all of the thrust generated by the two propellers 31 and 41 can be devoted solely to driving the helicopter 20 forwards in order to improve its performance.

Furthermore, when the hybrid helicopter 20 has lift surfaces 23 on either side of the fuselage, additional lift is created in cruising flight. Under such circumstances, the lift from the main rotor 21 can be reduced, either by modifying the angle of incidence of the blades 27 of the main rotor 21, or by reducing the speed of rotation of the main rotor 21. Either way, the turning effect of the main rotor 21 is reduced. Once more, most or all of the thrust generated by the two propellers 31 and 41 can then be devoted solely to making the helicopter 20 advance.

Figure 6:
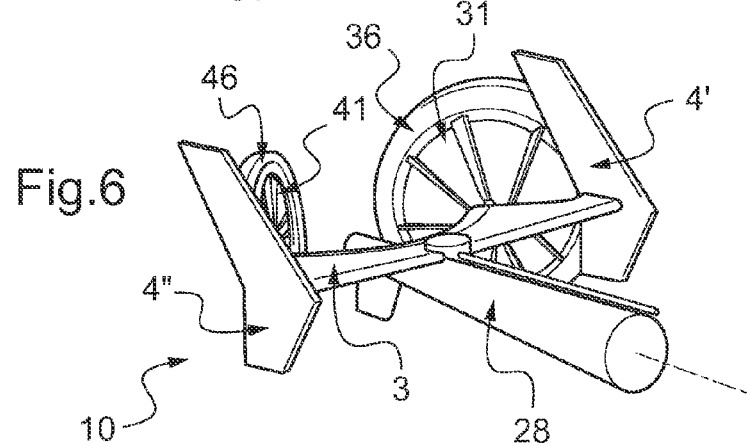
FIG. 6 shows another embodiment of the invention.

In another embodiment of the invention as shown in FIG. 6, the first propeller 31 and the second propeller 41 of the tail assembly 10 are ducted by means of fairings 36 and 46 that serve essentially to protect the environment outside the rotating elements constituting the propellers 31 and 41, and also to protect the propellers 31 and 41 from the outside environment.

People moving around the helicopter 20 are thus protected from the first rotary blades 32 and the second rotary blades 42 by the fairings 36 and 46. Similarly, the first propeller 31 and the second propeller 41 are protected from external elements that might penetrate into the perimeter of rotation of the first blades 32 and of the second blades 42, thereby damaging them.

In another embodiment shown in FIG. 7, the plane of the propeller axes formed by the first axis 35 and the second axis 45 is inclined at an angle α about the longitudinal axis of the helicopter 20 in order to compensate for the weight of the tail assembly 10. In spite of using a common tail gearbox 6 for the first and second propellers 31 and 41, using two propellers increases the weight of the tail assembly 10, and thus the weight at the end of the tail boom 28 of the helicopter 20. Tilting the plane of the axes of the propellers 31 and 41 in this way allows a vertical component of the transverse thrust resulting from the tail assembly 10 to oppose this weight.

Furthermore, at high forward speeds, the transverse stabilizer 3 may also be dimensioned to create lift suitable for compensating the weight of the tail assembly 10 in full or in part.

In another variant, the plane of the propeller axes is inclined about the transverse axis of the helicopter 20. This principle then makes use of a portion of the longitudinal component to compensate for the weight of the tail assembly 10.

In another embodiment of the invention shown in FIG. 8, a helicopter 20 may be defined to be capable of using either a rear structure 52 having a tail beam 54 and a conventional tail rotor 53 for providing the helicopter 20 with yaw control, or else a tail assembly 10 of the invention, for providing the helicopter 20 both with yaw control and with thrust.

Under such circumstances, a rear structure 52 and the tail assembly 10 are interchangeable. This transformation is made possible by the particular features of the invention, in particular the lever arm of the tail assembly 10 about the center of gravity of the rotorcraft is equivalent to the lever arm of the tail boom 52 carrying the conventional tail rotor 53.

In addition, since the controls for this tail assembly 10 are identical to the controls of a conventional tail rotor 53, with the exception of longitudinal thrust control, it is relatively simple to modify the helicopter 20.

Finally, the possibility of using electric motors for controlling the movements of the rocker 7 makes such transformation simpler by limiting the number of mechanical controls between the airframe 22 and the tail of the helicopter 20.

A lift surface 23 having control surfaces 24 and extending transversely on either side of the airframe 22 may also be added when using the tail assembly 10, thereby transforming the helicopter 20 into a hybrid helicopter presenting long range and high forward speed in cruising flight.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A tail assembly for a rotorcraft, the tail assembly comprising:
    a tail boom extending along a longitudinal axis from a front end towards a rear end and suitable for being fastened to an airframe of said rotorcraft towards a rear end thereof;
    an anteroposterior plane (P1) extending from the front end of said tail boom towards the rear end of said tail boom and along said longitudinal axis and along an elevation axis of said assembly;
    a horizontal plane (P3) perpendicular to said elevation axis and containing the center of gravity of said assembly;
    a first propeller having at least two first blades driven in rotation about a first axis, the first blades comprising a tip rotating in a first rotating plane; and
    a second propeller having at least two second blades driven in rotation about a second axis, the second blades having a tip rotating in a second rotating plane;
    said first and second propellers being positioned on either side of said anteroposterior plane (P1) in order to provide at least part of the yaw control and the propulsion of said rotorcraft, wherein said first axis of rotation and said second axis of rotation intersect at a position in said anteroposterior plane (P1) located between said front end of said tail boom and said first and second propellers, said position being entirely forward of an intersection of the first axis with the first rotating plane of said first propeller, said position being entirely forward of another intersection of the second axis with the second rotating plane of said second propeller.

2. A tail assembly according to claim 1, wherein the assembly includes a first stabilizer extending transversely on either side of said anteroposterior plane (P1) and a second stabilizer extending in elevation, said first and second stabilizers being located between the front end of said tail boom and said first and second propellers.

3. A tail assembly according to claim 2, wherein said second stabilizer is made up of two airfoils, each located at a respective end of said first stabilizer.

4. A tail assembly according to claim 1, wherein said first and second axes of rotation form between them an angle equal to 90° and are positioned symmetrically about said anteroposterior plane (P1).

5. A tail assembly according to claim 1, wherein said first and second propellers are driven in rotation by a common tail power gearbox.

6. A tail assembly according to claim 1, wherein the plane of the propeller axes formed by said first and second axes is inclined relative to said horizontal plane (P3) in order to compensate for the weight of said assembly.

7. A tail assembly according to claim 1, wherein said assembly includes a rocker for simultaneously controlling a first pitch of said first blades of said first propeller and a second pitch of said second blades of said second propeller so that the transverse and longitudinal thrusts from said assembly can be controlled independently.

8. A tail assembly according to claim 7, wherein means for moving said rocker in translation control said first and second pitches in order to modify the longitudinal thrust from the assembly for constant transverse thrust, and means for turning said rocker control said first and second pitches so as to modify the transverse thrust from said assembly for constant longitudinal thrust.

9. A tail assembly according to claim 8, wherein said means for moving said rocker in translation comprise at least a first electric motor.

10. A tail assembly according to claim 7, wherein said means for turning said rocker comprise at least a second electric motor.

11. A tail assembly according to claim 1, wherein said assembly includes a first fairing for the first propeller and a second fairing for the second propeller.

12. A tail assembly according to claim 1, wherein said first and second propellers are contrarotating propellers.

13. A tail assembly according to claim 12, wherein said first and second propellers are meshing propellers.

14. A rotorcraft comprising:
at least one main rotor;
an airframe;
at least one engine; and
a tail assembly in particular to counter the torque created on the airframe by the main rotor;
wherein said tail assembly is according to claim 1.

15. A rotorcraft according to claim 14, wherein said tail assembly is removable, and said rotorcraft includes a rear structure having a tail boom and a single rotor, said rear structure being suitable for taking the place of said tail assembly.

16. A rotorcraft according claim 14, wherein a lift surface having at least two control surfaces and extending transversely on either side of said airframe can be added to said rotorcraft.

17. A tail assembly for a rotorcraft, the tail assembly comprising:
a tail boom extending along a longitudinal axis from a front end towards a rear end and adapted to be fastened to an airframe of the rotorcraft towards a rear end thereof, wherein the tail boom lies in an anteroposterior plane (P1) defined by the longitudinal axis and an elevation axis of the assembly, the anterposterior plane extending from the front end of the tail boom towards the rear end of said tail boom;
a first propeller having at least two first blades driven in rotation about a first axis of rotation, the first blades comprising a tip rotating in a first rotating plane; and
a second propeller having at least two second blades driven in rotation about a second axis of rotation, the second blades comprising a tip rotating in a second rotating plane;
a first stabilizer extending transversely on either side of said anteroposterior plane (P1); and
a second stabilizer having two airfoils extending in elevation, each airfoil located at respective end of said first stabilizer, each airfoil being offset from the longitudinal axis, each airfoil spaced apart along the longitudinal axis forward and beyond the reach of the first and second propellers;
wherein the first and second propellers are positioned on either side of the anteroposterior plane (P1) and provide at least part of the yaw control and the propulsion of the rotorcraft; and
wherein said first axis of rotation and said second axis of rotation intersect at a position in said anteroposterior plane (P1) located between the front end of said tail boom and the first and second propellers, such that the position is entirely forward of an intersection between the first axis of rotation and the first rotating plane and entirely forward of another intersection between the second axis of rotation and the second rotating plane.

18. The tail assembly of claim 17 wherein the first and second propellers define an open space therebetween extending through the anteroposterior plane (P1).

19. The tail assembly of claim 17 wherein the first and second propellers are positioned such that the air streams generated by each of the propellers diverge.

20. The tail assembly of claim 17 wherein the second stabilizer is without moving parts.

* * * * *